US012792043B2

(12) United States Patent
Fox-Rabinovitz et al.

(10) Patent No.: US 12,792,043 B2
(45) Date of Patent: Nov. 10, 2026

(54) ERROR MITIGATION TECHNIQUES FOR DEPENDENT SENSOR SIGNALS

(71) Applicant: TORC Robotics, Inc., Blacksburg, VA (US)

(72) Inventors: Joseph Fox-Rabinovitz, Austin, TX (US); Ryan Chilton, Blacksburg, VA (US); Vicent Rodrigo Marco, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 626 days.

(21) Appl. No.: 18/334,115

(22) Filed: Jun. 13, 2023

(65) Prior Publication Data

US 2024/0419174 A1 Dec. 19, 2024

(51) Int. Cl.
*G05D 1/00* (2024.01)

(52) U.S. Cl.
CPC .................................. *G05D 1/0274* (2013.01)

(58) Field of Classification Search
CPC .... G05D 1/0274; G05D 1/242; G05D 1/2462; G05D 1/248; G05D 1/646; G05D 1/0278; G05D 1/0276; G05D 1/027; G05D 1/0257; G05D 1/024; G05D 2105/28; G05D 2107/13; G05D 2109/10; G05D 2111/17; G01C 21/1652; G01C 21/1656; G01C 21/30; G01C 21/188; G01C 21/00; G01C 21/04; G01C 21/183; G01C 21/20; G01C 22/00; G01S 17/89; G01S 17/003; G01S 17/86; G01S 13/89; G01S 13/865
USPC ................... 73/488, 504.02; 340/988, 995.1; 382/103, 107, 104, 190; 700/258; 701/532, 472, 300, 500, 495, 469, 36; 702/85, 94, 95, 97, 86, 87, 88, 104, 141,
(Continued)

(56) References Cited

U.S. PATENT DOCUMENTS 9,080,886 B1 * 7/2015 Lacaze .................. G01C 21/28
10,620,296 B1 * 4/2020 Ezal .......................... G01S 1/14
(Continued)

FOREIGN PATENT DOCUMENTS

CA 2859112 A1 * 3/2011 ............... G05D 3/00
CN 113110496 A * 7/2021 ........... G05D 1/0236
(Continued)

*Primary Examiner* — Manuel A Rivera Vargas
(74) *Attorney, Agent, or Firm* — Armstrong Teasdale LLP

(57) ABSTRACT

Embodiments described herein implement an improved autonomy system with a beneficial approach to implementation a localization loop. When the automated vehicle loses access to geolocation data updates, the autonomy system invokes a geo-denied localization loop that performs map localization and motion estimation functions without geolocation data. The localization loop feeds map localizer outputs into a motion estimator of the INS and/or the IMU, and feeds motion estimation outputs from the motion estimator back into the map localizer. When executing the localization loop, the autonomy system detects outlier measurements as errors in the map localizer and mitigates the errors in the map localizer or the motion estimator. The autonomy system executes programming in an error detection phase for monitoring and detecting errors in the localization loop, and an error mitigation phase for mitigating or resolving errors, such as applying a covariance boosting value on outputted data values.

19 Claims, 4 Drawing Sheets

(58) Field of Classification Search
USPC ....... 702/150, 159, 127, 151, 152, 153, 158, 702/155
See application file for complete search history.

(56) References Cited

U.S. PATENT DOCUMENTS

| | | | | |
|---|---|---|---|---|
| 11,756,229 | B2 * | 9/2023 | Sommer | G06T 7/73 382/103 |
| 11,808,590 | B2 * | 11/2023 | Rus | G01C 21/28 |
| 12,228,424 | B2 * | 2/2025 | Aviel | G01C 21/3837 |
| 2012/0221244 | A1 * | 8/2012 | Georgy | G01S 19/47 701/472 |
| 2016/0227366 | A1 * | 8/2016 | Georgy | G01S 5/12 |
| 2017/0269586 | A1 * | 9/2017 | D'Andrea | G01S 5/02695 |
| 2020/0160558 | A1 * | 5/2020 | Urtasun | G06T 7/75 |
| 2020/0232806 | A1 * | 7/2020 | Goldman | G08G 1/167 |
| 2021/0302993 | A1 * | 9/2021 | Zang | G01C 21/30 |
| 2021/0372796 | A1 * | 12/2021 | Lin | G01C 21/20 |
| 2021/0396542 | A1 * | 12/2021 | Toutov | G01C 21/1654 |
| 2022/0155801 | A1 * | 5/2022 | van Dijk | G01C 21/20 |
| 2022/0163616 | A1 * | 5/2022 | Rappaport | G01C 21/206 |
| 2022/0260663 | A1 * | 8/2022 | Pados | G01S 3/8022 |
| 2022/0341740 | A1 * | 10/2022 | Nagy | G01C 21/3415 |
| 2023/0204364 | A1 * | 6/2023 | Nachstedt | G01S 19/485 701/445 |
| 2023/0236022 | A1 * | 7/2023 | Thomas | G01C 21/30 701/445 |
| 2024/0092397 | A1 * | 3/2024 | Carter | B60W 60/0027 |
| 2024/0419181 | A1 * | 12/2024 | Jeong | B25J 19/02 |

FOREIGN PATENT DOCUMENTS

| | | | | |
|---|---|---|---|---|
| WO | WO-2014113874 | A1 * | 7/2014 | G01C 22/002 |
| WO | WO-2015031979 | A1 * | 3/2015 | G01S 5/02525 |
| WO | WO-2015035501 | A1 * | 3/2015 | H04W 4/02 |
| WO | WO-2018048353 | A1 * | 3/2018 | G01C 21/3848 |
| WO | WO-2020003319 | A1 * | 1/2020 | G01C 21/206 |

* cited by examiner

ERROR MITIGATION TECHNIQUES FOR DEPENDENT SENSOR SIGNALS

TECHNICAL FIELD

This application generally relates to managing operations of automated vehicles, including localization functions for localizing an automated vehicle using sensor data when geolocation data is unavailable.

BACKGROUND

An autonomy system of an automated vehicle executes map localization and navigation functions to receive sensor data from various sensors and real-time geolocation data from external global location services to estimate a location and motion of the automated vehicle for navigating the automated vehicle. In some circumstances, the autonomy system loses access to the real-time geolocation data, which inhibits the autonomy system from properly navigating the automated vehicle. What is needed is a means of accurately generating map localization and motion outputs of the automated vehicle when the automated vehicle lacks access to the real-time geolocation data.

SUMMARY

A proposed solution includes invoking a localization loop between a map localizer and a motion estimation engine. Prior proposed solutions, however, failed to consider the issues needed to avoid negative effects of drift in the sensor data or outputs of the map localizer and the motion estimator before errors propagate over successive iterations of the localization loop.

Embodiments described herein implement an improved autonomy system with a beneficial approach to implementation a localization loop. After the autonomy system detects and determines the loss of access to the external geolocation data updates from the geolocation service, the autonomy system invokes and enters a geo-denied operational state. When the autonomy system enters the geo-denied state, the map localizer or other component of the autonomy system invokes the geo-denied localization loop that performs the map localization and motion estimation functions without geolocation data. The localization loop moves outputs from the map localizer back into a motion estimator of the INS and/or the IMU, and moves the motion estimation outputs from the motion estimator back into the map localizer. In this way, the automated vehicle may navigate through an environment without the geolocation data. The embodiments of the autonomy system disclosed herein detect and mitigate outlier measurements and errors in the outputs or inputs for the map localizer or the motion estimator. The autonomy system executes programming in an error detection phase for monitoring and detecting errors in the localization loop, and an error mitigation phase for resolving errors detected in the localization loop.

In some embodiments, a method for geo-denied localization for an automated vehicle, the method comprising: detecting, by a processor of an automated vehicle, a geo-denied state of the automated vehicle based upon geo-location data from a geo-location device of the automated vehicle; invoking, by the processor, programming of a localization loop of a map localizer and a motion estimator in response to the processor detecting the geo-denied state; during execution of a first iteration of the localization loop in the geo-denied state: generating, by the processor, an estimated location of the automated vehicle by applying the map localizer on LiDAR data of the sensor data obtained for the first iteration from a LiDAR sensor of the plurality of sensors; and generating, by the processor, an estimated motion of the automated vehicle by applying the motion estimator on the estimated location from the map localizer and on the sensor data obtained for the first iteration.

In some embodiments, a system for localizing and navigating an automated vehicle, the system comprising: a plurality of sensors of an automated vehicle for generating sensor data, including a geolocation device for obtaining geolocation data from a geolocation service system and a LiDAR sensor for obtaining LiDAR data; a processor coupled to the plurality of sensors and configured to: invoke programming of a localization loop of a map localizer and a motion estimator, in response to detecting a geo-denied state based upon the geo-location data; during execution of a first iteration of the localization loop in the geo-denied state: generate an estimated location of the automated vehicle by applying the map localizer on LiDAR data of the sensor data obtained for the first iteration; and generate an estimated motion of the automated vehicle by applying the motion estimator on the estimated location from the map localizer and on the sensor data obtained for the first iteration.

In some embodiments, a method for mitigating errors in localization loops for automated vehicles, the method comprising: detecting, by a processor of an automated vehicle, a geo-denied state of the automated vehicle based upon geo-location data from a geo-location device of the automated vehicle; invoking, by the processor, programming of a localization loop including plurality of iterations of a map localizer and a motion estimator, in response to the processor detecting the geo-denied state; during execution of an iteration of the localization loop in the geo-denied state: identifying, by the processor, an outlier measurement obtained based upon the sensor data exceeding an error measurement threshold, thereby detecting an error in an output of the map localizer of the localization loop; applying, by the processor, a covariance boost value on the outlier measurement, thereby generated boosted sensor data; and generating, by the processor, an estimated location using the boosted sensor data, and an estimated motion using the estimated location and the boosted sensor data.

In some embodiments, a system for localizing and navigating an automated vehicle, the system comprising: a plurality of sensors of an automated vehicle for generating sensor data, including a geolocation device for obtaining geolocation data from a geolocation service system and a LiDAR sensor for obtaining LiDAR data; a processor coupled to the plurality of sensors and configured to: invoke programming of a localization loop of a map localizer and a motion estimator, in response to detecting a geo-denied state based upon the geo-location data; during execution of an iteration of the localization loop of the geo-denied state: identify an outlier measurement obtained based upon the sensor data exceeding an error measurement threshold, thereby detecting an error in an output of the map localizer of the localization loop; apply a covariance boost value on the outlier measurement, thereby generated boosted sensor data; and generate an estimated location using the boosted sensor data, and an estimated motion using the estimated location and the boosted sensor data.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views. The accompanying drawings, which are incorporated in and constitute a part of this specification, illustrate various exemplary embodiments and together with the description, serve to explain the principles of the disclosed embodiments.

DETAILED DESCRIPTION

Figure 1:
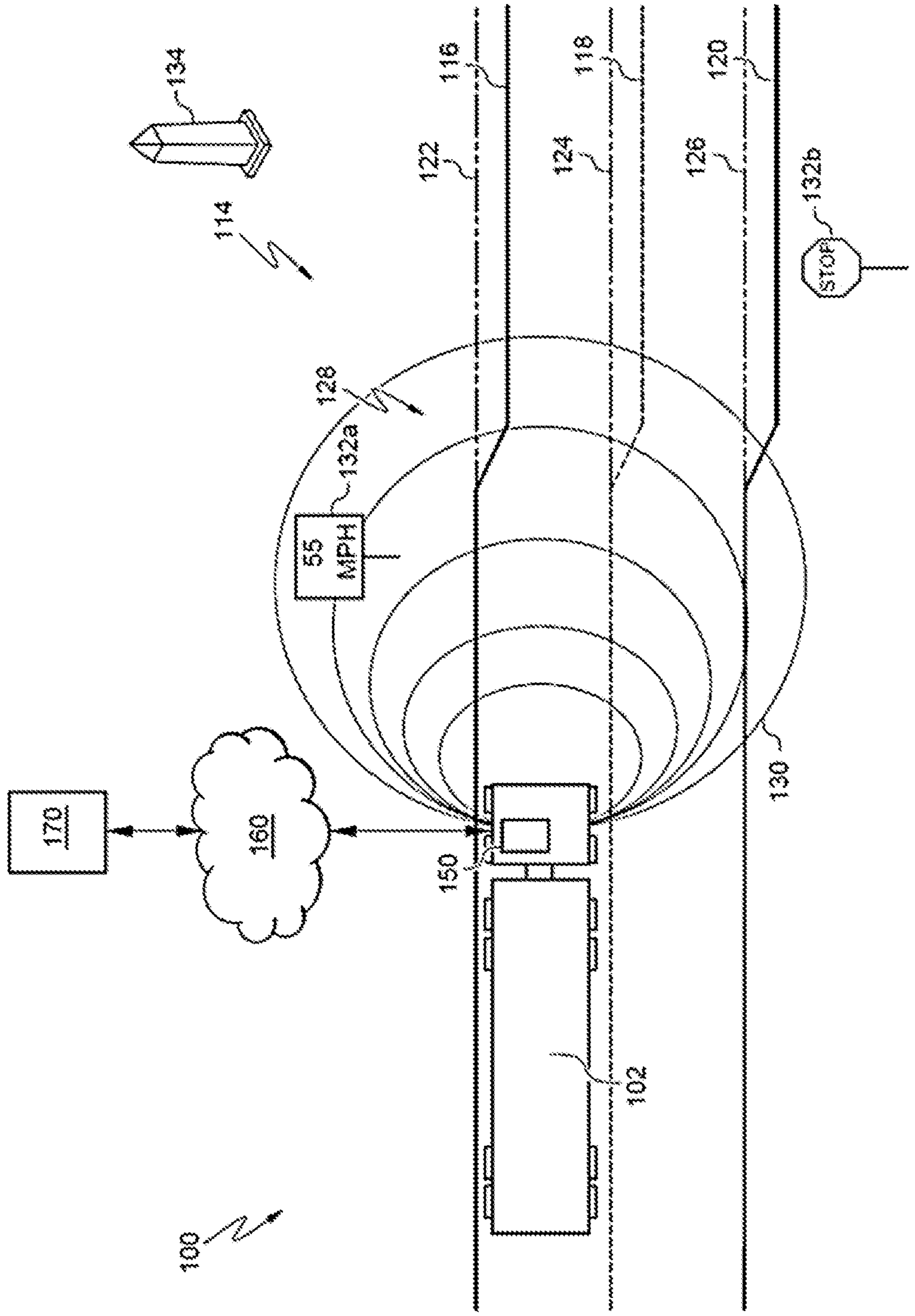
FIG. 1 is a bird's eye view of a roadway environment including a schematic representation of an automated vehicle and aspects of an autonomy system of the automated truck, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Embodiments described herein relate to automated vehicles having computer-driven automated driver systems (sometimes referred to as "autonomy systems"). The automated vehicle may be completely autonomous (fully-autonomous), such as self-driving, driverless, or SAE Level 4 autonomy, or semi-autonomous, such as SAE Level 3 autonomy. As used herein the terms "autonomous vehicle" and "automated vehicle" includes both fully-autonomous and semi-autonomous vehicles. The present disclosure sometimes refers to automated vehicles as "ego vehicles."

Generally, autonomy systems of automated vehicles are logically structured according to three pillars of technology: 1) perception; 2) maps/localization; and 3) behaviors, planning, and control.

The function of the perception aspect is to sense an environment surrounding the automated vehicle by gathering and interpreting sensor data. To interpret the surrounding environment, a perception module or engine in the autonomy system may identify and classify objects or groups of objects in the environment. For example, a perception module associated with various sensors (e.g., LiDAR, camera, radar, etc.) of the autonomy system may identify one or more objects (e.g., pedestrians, vehicles, debris, etc.) and features of a roadway (e.g., lane lines) around the automated vehicle, and classify the objects in the road distinctly.

The maps/localization aspect (sometimes referred to as a "map localizer") of the autonomy system determines where on a pre-established digital map the automated vehicle is currently located, sometimes referred to a "map localization" or "MapLoc" functions. One technique for map localization is to sense the environment surrounding the automated vehicle (e.g., via the perception system) and to correlate features of the sensed environment with details (e.g., digital representations of the features of the sensed environment) on the digital map. After the systems of the autonomy system have determined the location of the automated vehicle with respect to the digital map features (e.g., location on the roadway, upcoming intersections, road signs, etc.), the automated vehicle can plan and execute maneuvers and/or routes with respect to the features of the digital map.

The behaviors, planning, and control aspects (e.g., motion or navigation control functions) of the autonomy system to make decisions about how an automated vehicle should move through the environment to get to a calculated goal or destination. For instance, the behaviors, planning, and control components of the autonomy system consumes information from the perception engine and the maps/localization modules to know where the ego vehicle is relative to the surrounding environment and what other traffic actors are doing. The behaviors, planning, and control components may be responsible for decision-making to ensure, for example, the vehicle follows rules of the road and interacts with other aspects and features in the surrounding environment (e.g., other vehicles) in a manner that would be expected of, for example, a human driver. The behavior planning may achieve this using a number of tools including, for example, goal setting (local/global), implementation of one or more bounds, virtual obstacles, and using other tools.

The automated vehicle includes various types of sensors that generate the various types of data, which the autonomy system obtains (e.g., receives, retrieves), ingests, or otherwise references to perform navigation functions. The autonomy system performs vehicle navigation by fusing information from the multiple sensors. For example, the autonomy system includes an Inertial Navigation System (INS) that gathers various types of data from a Global Navigation Satellite System (GNSS), an Inertial Measurement Unit (IMU), a Wheel Speed Sensor (WSS), a radar, a sensor-perception stack built on camera data, and a mapping stack that uses LiDAR. In many instances, the data sources are independent and contain independent error detection and mitigation techniques. The geolocation device includes any device that receives geolocation data from a GNSS, such as a GPS device, and provides the geolocation data to the INS. The IMU includes hardware and software processing components that receive inertial sensor data from inertial sensors (e.g., accelerometer, gyroscope) aboard the automated vehicle. The IMU may provide the inertial data to the INS. The WSS includes hardware and software components on board the automated vehicle for generating wheel speed data, which may include wheel speed measurements among other types of measurements that the WSS or other component of the automated vehicle could derive from the wheel speed measurements. The radar includes hardware and software components for generating radar data for the INS.

The sensor-perception functions gather image data from on board cameras situated at various points around the automated vehicle. The sensor-perception functions may perform various types of functions or operations to sense an environment around the automated vehicle. As an example, the sensor-perception functions may perform object recognition functions based on the image data captured by the cameras.

The mapping functions gather LiDAR data from on board LiDAR sensors, situated at various points around the automated vehicle. The mapping functions perform various functions or operations for sensing the environment or determining a local pose (e.g., location, position, orientation) of the automated vehicle.

A map localizer may receive information from the INS or other component of the autonomy system for an estimate location, which may include global pose data, such as a reference to global latitude and longitude of the automated vehicle. The perception function stack for the INS generates relative information as a local-reference frame for a local pose. The map localizer may use the global pose and the local pose for various localization functions for determining and confirming the automated vehicle's location relative to pre-stored base maps. The INS executes motion estimator functions, including a motion estimator filter (e.g., Kalman filter), for generating an estimated motion, which may include local pose data of the automated vehicle. The INS generates the estimated motion using the estimated location from the map localizer.

In some circumstances, the autonomy system loses access to real time geolocation data that provides real-time geolocation data about automated vehicle's global geo-position, typically received from the GNSS. After the autonomy system detects and determines the loss of access to the external geolocation data updates from the GNSS or similar system, the autonomy system invokes and enters a geo-denied operational state. When the autonomy system enters the geo-denied state, the map localizer or other component of the autonomy system invokes a geo-denied localization loop that performs the map localization functions without geolocation data (sometimes referred to as "self-localization"). The localization loop moves outputs from the map localizer back into a motion estimator of the INS and/or the IMU, and moves the motion estimation outputs from the motion estimator back into the map localizer. In this way, the automated vehicle may navigate through an environment without the geolocation data.

The geo-denied localization loop uses two dependent or recursive sources of information. Typically, the map localizer aligns the images in successive LiDAR frames to each other and to the image in a pre-stored local base map using both relative local reference information and global reference information. The benefits of being able to operate the automated vehicle using the multiple modalities, and without the geolocation data from the GNSS, are significant. However, the dependencies could cause catastrophic feedback errors in a number of ways. Embodiments disclosed herein include an autonomy system that executes an approach for map localization that adds robustness to the localization feedback loop and avoid significant errors.

A risk in using dependent signals (e.g., map localizer outputs in a feedback loop with the motion estimator of the INS), is that of a destructive feedback error occurring when the map localizer latches onto a locally optimal solution due to errors in motion estimate outputs from the INS that feed the motion estimate inputs to the map localizer. The map localizer would ignore a globally optimal solution, causing the entire navigation system to experience a systematic error undetectable to the autonomy system. Embodiments disclosed herein include an autonomy system capable of detecting and mitigating such errors. In the geo-denied state, the autonomy system executes programming in an error detection phase for monitoring and detecting errors in the localization loop, and an error mitigation phase for resolving errors detected in the localization loop.

FIG. 1 is a bird's eye view of a roadway environment 100 including a schematic representation of an automated vehicle (shown as an autonomous, tractor-trailer truck 102) and aspects of an autonomy system 150 of the automated truck 102, according to an embodiment. The roadway environment 100 includes various objects located at or nearby a road 114 of the roadway environment 100 and characteristics of the road 114, such as lane lines 116, 118, 120 and a bend 128 in the road 114. The objects include the autonomous truck 102 (sometimes referred to as an "ego" or "ego vehicle"), road signs 132*a*, 132*b* and the landmark 134.

Moreover, FIG. 1 shows aspects of the autonomy system 150 of the autonomous truck 102 for modifying one or more actions of the truck 102, such as driving or navigating instructions. The truck 102 includes hardware and software components allowing the autonomy system 150 to communicate wirelessly with a remote server 170 via one or more networks 160. The truck 102 and autonomy system 150 need not necessarily connect with the network 160 or server 170 while in operation (e.g., driving down the roadway). The server 170 is remotely situated from the truck 102 (e.g., not at the truck 102), and the truck 102 may deploy with all the necessary perception, localization, and vehicle control software and data necessary to complete its mission fully-autonomously or semi-autonomously.

The autonomy system 150 of the autonomous truck 102 captures various types of data about the environment 100 and generates the driving instructions for navigating or otherwise operating the autonomous truck 102. The autonomy system 150 of truck 102 may be completely autonomous (fully-autonomous), such as self-driving, driverless, or SAE Level 4 autonomy, or semi-autonomous, such as Level 3 autonomy. As used herein the term "autonomous" includes both fully-autonomous and semi-autonomous. While the description of FIG. 1 refers to the automated vehicle as the truck 102 (e.g., tractor trailer), the automated vehicle in possible embodiments could be any type of vehicle, including an automobile, a mobile industrial machine, or the like. While the disclosure discusses automated vehicles having a self-driving or driverless autonomy system, the autonomy system in possible embodiments could be semi-autonomous, where the autonomy system provides varying degrees of autonomy or autonomous functionality. In some embodiments, various types of data or software components of the autonomy system may be stored or executed by the remote server 170, which the remote server 170 reports back to the autonomy system 150 of the truck 102 via the network 160.

The autonomy system 150 may be logically structured on at least three aspects of automated vehicle technology: (1) perception technology aspects ("perception module"), (2) maps/localization technology aspects ("map localizer"), and (3) behaviors, planning, and control technology aspects ("operation engine").

The function of the perception technology aspects is to sense an environment surrounding truck 102 and interpret sensor data, including motion data, location data, position data, inertial data, or other types of sensor data. To interpret the surrounding environment 100, the perception engine or module of the autonomy system 150 of the truck 102 may identify and classify objects or groups of objects in the environment 100. For example, a perception module associated with various sensors (e.g., LiDAR sensors, camera, radar sensors, inertial sensors, wheel speed sensor (WSS), geolocation devices for receiving GNSS data) of the autonomy system 150. The perception module may include, for example, computer vision functions that may identify one or more objects (e.g., pedestrians, vehicles, debris) and features of the roadway (e.g., lane lines) around truck 102, and classify the objects in the road distinctly; and an Inertial Measurement Unit (IMU) and/or Inertial Navigation System (INS) for inertial calculations or motion-related data and functions.

The map localizer of the autonomy system 150 includes software programming that determines where the truck 102 is currently located within the context of a pre-established and pre-stored digital map. The perception module gathers data to sense the environment 100 surrounding the truck 102 and the map localizer correlates features of the sensed environment against details on the digital map (e.g., digital representations of the features of the sensed environment).

The map localizer receives the sensor data and measurements from the perception module or from external data sources, such as obtaining the digital map from non-transitory machine-readable storage of the truck 102 or at the remote server 107. The map localizer generates the sensed maps based upon the sensor data received from optical sensors of the truck 102. The sensor data for generating the sensed maps may originate from any type of optical sensor that generates and returns intensity measurements for the reflectivity of a reflected signal and height measurements for the objects that reflected the reflected signal. Non-limiting examples of the optical sensors used for generating the sensed maps include a LiDAR sensor, a radar sensor, and a Realsense® sensor, among others. The map localizer aligns and compares the sensed maps against pre-stored digital maps to iteratively estimate the location of the truck 102.

After the autonomy system 150 determines the location of the truck 102 with respect to the digital map features (e.g., location on the road 114, upcoming intersections, road signs 132, etc.), the operating module of the autonomy system 150 can plan and execute maneuvers and/or routes with respect to the features of the digital map. The operating module of the autonomy system 150 includes software programming that makes decisions about how the truck 102 should move or navigate through the environment 100 to get to a goal or destination. The operating module may consume information from the perception module and map localizer to recognize how to navigate the environment 100 relative to the objects in the environment 100 and where the truck 102 is currently located.

Figure 2:
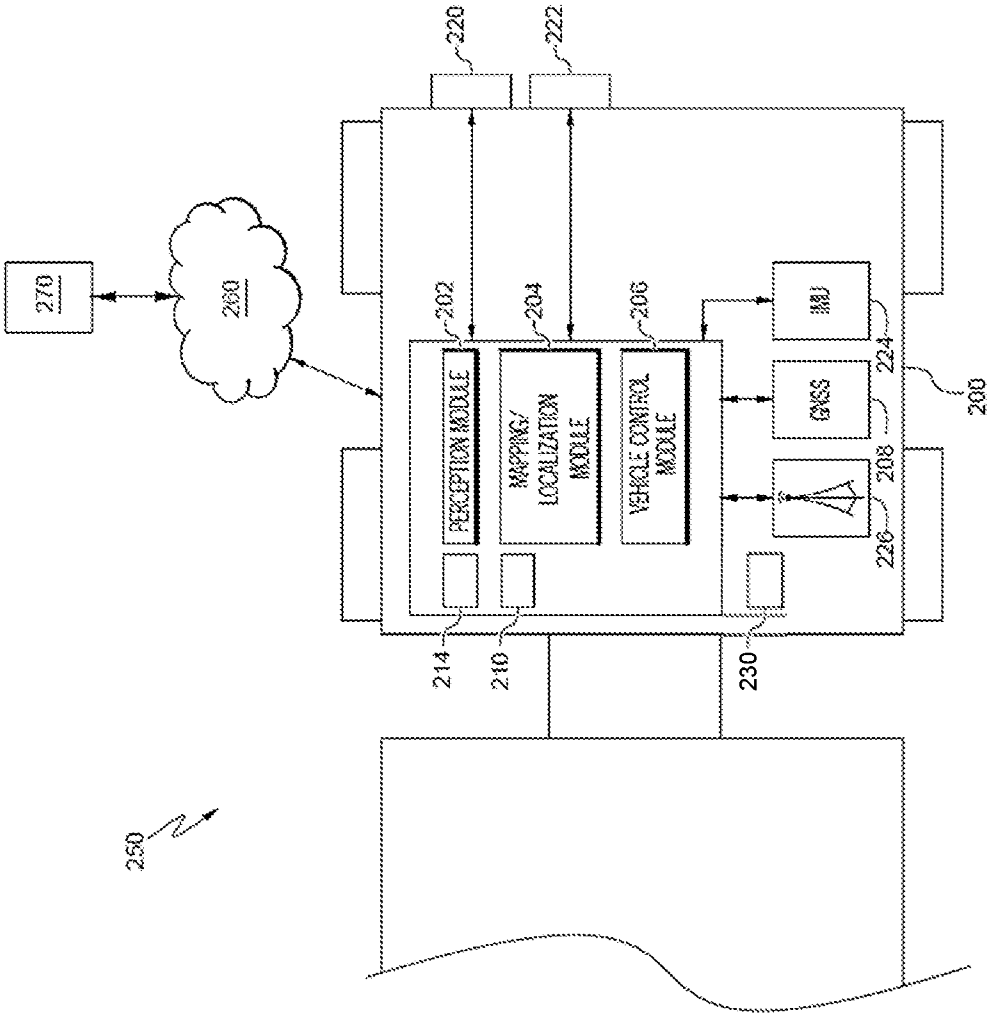
FIG. 2 is a schematic of the autonomy system of an automated vehicle, according to an embodiment.

FIG. 2 is a schematic of the autonomy system 250 of an automated vehicle, such as an autonomous truck 200 (e.g., autonomous truck 102 in FIG. 1), according to an embodiment. The autonomy system 250 may include hardware and software components for a perception system, including a camera system 220, a LiDAR system 222, a radar system 232, a GNSS receiver 208, an IMU 224, and/or a perception module 202. The autonomy system 250 may further include a transceiver 226, a processor 210, a memory 214, a map localizer 204 (sometimes referred to as a "mapping/localization module"), and a vehicle control module 206 (sometimes referred to as an "operating module"). The various systems may serve as inputs to and receive outputs from various other components of the autonomy system 250. Embodiments of the autonomy system 250 may include more, fewer, or different components or systems, and each of the components or system(s) may include more, fewer, or different components. Additionally, the systems and components shown may be combined or distributed in various ways. As show in FIG. 1, the components of perception system aboard the automated vehicle enable the truck 102 to perceive the environment 100 within a perception radius 130. The actions of the truck 102 may depend on the extent of perception radius 130.

In some embodiments, some or all of the components of the perception system 202 are components of an INS (not shown), which may be a subsystem of the perception system 202 or distinct from the perception system 202. The INS component of the truck 200 generates various data outputs for determining the position, orientation, and velocity of the truck 200. The INS receives as input, the sensor data from, for example, the IMU 224, accelerometers, and/or gyroscopes. The INS may use geolocation data received from the GNSS, though the INS need not rely on external data references and could rely upon the sensor data of the truck 200. In operation, the INS provides continuous, accurate, and real-time location-related information about a vehicle state (or "pose") with respect to a local reference frame ("local pose") and the map localizer 204 receives the global pose data and generates a global pose with respect to a global reference frame ("global pose").

The camera system 220 of the perception system may include one or more cameras mounted at any location on the truck 200, which may be configured to capture images of the environment surrounding the truck 200 in any aspect or field of view (FOV). The FOV can have any angle or aspect such that images of the areas ahead of, to the side, and behind the truck 102 may be captured. In some embodiments, the FOV may be limited to particular areas around the truck 102 (e.g., forward of the truck 200) or may surround 360-degrees of the truck 200. In some embodiments, the image data generated by the camera system(s) 220 may be sent to the perception module 202 and stored, for example, in memory 214. In some embodiments, the image data generated by the camera system(s) 220, as well as any classification data or object detection data (e.g., bounding boxes, estimated distance information, velocity information, mass information) generated by the object tracking and classification module 230, can be transmitted to the remote server 270 for additional processing (e.g., correction of detected misclassifications from the image data, training of artificial intelligence models, etc.).

The LiDAR system 222 may include a laser generator and a detector and can send and receive a LiDAR signals. The LiDAR signal can be emitted to and received from any direction such that LiDAR point clouds (or "LiDAR images") of the areas ahead of, to the side, and behind the truck 200 can be captured and stored as LiDAR point clouds. In some embodiments, the truck 200 may include multiple LiDAR systems and point cloud data from the multiple systems may be stitched together for a sensed map or sub-map(s). In some embodiments, the system inputs from the camera system 220 and the LiDAR system 222 may be fused in the mapping module 204 or perception module 202. The LiDAR system 222 may include one or more actuators to modify a position and/or orientation of the LiDAR system 222 or components thereof. The LIDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the truck 200 (or object(s) therein). In some embodiments, the point cloud may be rendered as one or more polygon(s) or mesh model(s) through, for example, surface reconstruction. Collectively, the LiDAR system 222, radar system 232, and the camera system 220 may be referred to herein as "imaging systems."

The radar system 232 may estimate strength or effective mass of an object, as objects made out of paper or plastic may be weakly detected. The radar system 232 may be based on 24 GHZ, 77 GHZ, or other frequency radio waves. The radar system 232 may include short-range radar (SRR), mid-range radar (MRR), or long-range radar (LRR). One or more sensors may emit radio waves, and a processor processes received reflected data (e.g., raw radar sensor data). The sensors or processors of the autonomy system may generate certain measurements using reflections returns, such as height measurements or reflective intensity measurements ("reflectivity measurements").

The GNSS receiver 208 may be positioned on the truck 200 and may be configured to determine a location of the truck 200 via GNSS data, as described herein. The GNSS receiver 208 may be configured to receive one or more signals from a global navigation satellite system (GNSS) (e.g., GPS system) to localize the truck 200 via geolocation. The GNSS receiver 208 may provide an input to and otherwise communicate with map localizer 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more inertial or motion-related data regarding the motion of the truck 200. For example, the IMU 224 may measure a velocity, acceleration, angular rate, and or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the map localizer 204, to help determine a real-time location of the truck 200, and predict a location of the truck 200 even when the GNSS receiver 208 cannot receive satellite signals.

The transceiver 226 may be configured to communicate with one or more external networks 260 via, for example, a wired or wireless connection in order to send and receive information (e.g., to/from a remote server 270). The wireless connection may be a wireless communication signal (e.g., Wi-Fi, cellular, LTE, 5G). In some embodiments, the transceiver 226 may be configured to communicate with external network(s) via a wired connection, such as, for example, during initial installation, testing, or service of the autonomy system 250 of the truck 200. The network connection may be used to download, via the one or more networks 260, and install various lines of code in the form of digital files (e.g., digital maps), executable programs (e.g., navigation programs), and other computer-readable code that may be used by the system 250 to navigate the truck 200 or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand.

In some embodiments, the truck 200 may not be in constant communication with the network 260 and updates which would otherwise be sent from the network 260 to the truck 200 may be stored locally at the truck 200 and/or at the network 260 until such time as the network connection is restored. In some embodiments, the truck 200 may deploy with all of the data and software it needs to complete a mission (e.g., necessary perception, localization, and mission planning data) and may not utilize any connection to network 260 during some or the entire mission. Additionally, the truck 200 may send updates to the network 260 (e.g., regarding unknown or newly detected features in the environment as detected by perception systems) using the transceiver 226. For example, when the autonomy system 250 detects differences in the perceived environment with the features on a digital map, the truck 200 may update the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. Autonomy system 250 may include a single microprocessor or multiple microprocessors that may include means for identifying and reacting to differences between features in the perceived environment and features of the maps stored on the truck 200. Numerous commercially available microprocessors can be configured to perform the functions of the autonomy system 250. It should be appreciated that autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote of truck. Various other known circuits may be associated with the autonomy system 250, including signal-conditioning circuitry, communication circuitry, actuation circuitry, and other appropriate circuitry.

The memory 214 of autonomy system 250 includes non-transitory machine-readable storage configured to store data and/or software routines that assist the autonomy system 250 in performing the various functions of the autonomy system 250, such as the functions of the perception module 202, the map localizer module 204, the vehicle control module 206, and the object-tracking and classification module 230, among others. Further, the memory 214 may also store data received from various inputs associated with the autonomy system 250, such as perception data from the perception system. For example, the memory 214 may store image data generated by the camera system(s) 220, as well as any classification data or object detection data (e.g., bounding boxes, estimated distance information, velocity information, mass information) generated by the object tracking and classification module 230.

As noted above, perception module 202 may receive input from the various sensors, such as camera system 220, LiDAR system 222, GNSS receiver 208, and/or IMU 224 (collectively "perception data") to sense an environment surrounding the truck and interpret the perception data. To interpret the surrounding environment, the perception module 202 may identify and classify objects or groups of objects in the environment. For example, the truck 202 may use the perception module 202 to identify one or more objects (e.g., pedestrians, vehicles, debris, etc.) or features of the roadway (e.g., intersections, road signs, lane lines, etc.) before or beside a vehicle and classify the objects in the road. In some embodiments, the perception module 202 may include an image classification function and/or a computer vision function. In some implementations, the perception module 202 may include, communicate with, or otherwise utilize the object tracking and classification module 230 to perform object detection and classification operations.

The perception system may collect the various types of perception data via the various corresponding types of sensors. The perception data may represent the perceived environment surrounding the vehicle, for example, and may be collected using aspects of the perception system described herein. The perception data can come from, for example, one or more of the LiDAR system 220, the camera system, and various other externally-facing sensors and systems on board the truck 200 (e.g., GNSS receiver 208). For instance, on a truck 200 having a LiDAR 220 or radar system, the LiDAR 220 and/or radar systems may collect perception data. As the truck 200 travels along the roadway, the system 250 may continually receive data from the various components of the system 250 and the truck 200. The system 250 may receive data periodically and/or continuously.

With respect to FIG. 1, the truck 102 may collect perception data that indicates presence of the lane lines 116, 118, 120. Features perceived by the vehicle should generally track with one or more features stored in a digital map (e.g., in the map localizer 204). Indeed, with respect to FIG. 1, the lane lines that are detected before the truck 102 is capable of detecting the bend 128 in the road (that is, the lane lines that are detected and correlated with a known, mapped feature) will generally match with features in stored map and the vehicle will continue to operate in a normal fashion (e.g., driving forward in the left lane of the roadway or per other local road rules). However, in the depicted scenario, the vehicle approaches a new bend 128 in the road 114 that is not stored in any of the digital maps onboard the truck 102 because the lane lines 116, 118, 120 have shifted right from original positions 122, 124, 126.

The system 150 may compare the collected perception data with stored data. For example, the system 150 may identify and classify various features detected in the collected perception data from the environment 100 with the features of a digital map stored in a non-transitory machine-readable storage medium of a datastore, on board the truck 100 or remote to the truck 100. For example, the detection systems of the system 150 may detect the lane lines 116. 118, 120 and may compare the detected lane lines 116, 118, 120 with stored lane lines stored in a digital map.

Additionally, the detection systems of the system 150 could detect the road signs 132*a*, 132*b* and the landmark 134 to compare such features with features in a digital map. The features may be stored as points (e.g., signs, small landmarks, etc.), lines (e.g., lane lines 116, 118, 120, edges of the road 114), or polygons (e.g., lakes, large landmarks 134) and may have various properties (e.g., style, visible range, refresh rate, etc.), which properties may control how the system 150 interacts with the various features. Based on the comparison of the detected features with the features stored in the digital map(s), the system 150 may generate a confidence level, which may represent a confidence of the truck 100 in a location with respect to the features on a digital map and hence, an actual location of the truck 100.

With reference to FIG. 2, the image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module (e.g., the object detection and classification module 230) that may be communicatively coupled to a repository of images or image data (e.g., visual data, point cloud data), which may be used to detect and classify objects and/or features in real time image data captured by, for example, the camera system 220 and the LiDAR system 222. In some embodiments, the image classification function may be configured to detect and classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size). The computer vision function may be embodied by a software module (e.g., the object detection and classification module 230) that may be communicatively coupled to a repository of images or image data (e.g., visual data; point cloud data), and may additionally implement the functionality of the image classification function.

The map localizer 204 receives the perception data to estimate the current location of the truck 200. Using the perception data from certain sensors, the map localizer 204 generates one or more sensed maps, which the map localizer 204 compares against one or more digital maps stored in the map localizer 204 to determine where the truck 200 is in the world (as global context in a global frame of reference) and/or determine where the truck 200 is on the digital map (as local context in a local frame of reference). For instance, the map localizer 204 may receive the perception data from the perception module 202 and/or directly from the various sensors sensing the environment surrounding the truck 200 and generate the sensed map(s) representing the sensed environment. The map localizer 204 may correlate features of the sensed map (e.g., digital representations of the features of the sensed environment) against details on the one or more digital maps (e.g., digital representations of the features of the digital map), such that map localizer 204 aligns the sensed map with the digital map. The map localizer 204 then identifies similarities and differences of the sensed map and digital map in order to estimate the location of the truck 200.

The digital map includes a computer-readable data file or data stream representing the details about a geographic locale, which may occur at various levels of details. The digital map includes, for example, a raster map, a vector map, and the like. The digital maps may be stored locally on the truck 200 and/or stored and accessed remotely. In some embodiments, the truck 200 deploys with sufficiently stored information in one or more digital map files to complete a mission without connection to an external network during the mission. In some embodiments, a centralized mapping system or other storage location is accessible, via the network 260, for updating the digital map(s) of the map localizer 204.

In some implementations, the digital map may be built through repeated observations of operating environments of past trips using any number of trucks 200 and/or other vehicles with similar functionality. For instance, the truck 200, a specialized mapping vehicle, a standard automated vehicle, or another vehicle, can run a route several times and collect the location of all targeted map features relative to the position of the vehicle conducting the map generation and correlation. In some cases, these repeated observations can be averaged together in a known way to produce a highly accurate, high-fidelity digital map and stored into a base map datastore. This generated digital map can be provided to each truck 200 (or other automated vehicle) via the network 260 before the truck 200 departs on the current trip. The autonomy system 250 of the truck 200 stores the digital map data into an onboard data storage (e.g., base map datastore), accessible to the map localizer 204 of the truck 200. Hence, the truck 200 and other vehicles (e.g., a fleet of trucks similar to the truck 200) can generate, maintain (e.g., update), and use the generated maps when conducting a mission or trip.

The generated digital map may include an assigned confidence score assigned to all or some of the individual digital feature representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 may control the behavior and maneuvers of the truck. For example, once the systems on the truck have determined its location with respect to map features (e.g., intersections, road signs, lane lines, etc.) the truck may use the vehicle control module 206 and its associated systems to plan and execute maneuvers and/or routes with respect to the features of the environment. The vehicle control module 206 may make decisions about how the truck will move through the environment to get to the goal or destination as the truck 200 completes the mission. The vehicle control module 206 may consume information from the perception module 202 and the map localizer 204 to know where the truck 200 is located relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the truck and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the truck 200. The steering system may be any combination of mechanisms configured to adjust the heading or direction of the truck 200. The brake system may be, for example, any combination of mechanisms configured to decelerate the truck 200 (e.g., friction braking system, regenerative braking system). The vehicle control module 206 may be configured to avoid obstacles in the environment surrounding the truck and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller and for vehicle lateral motion control and a propulsion and braking controller for vehicle longitudinal motion.

Figure 3:
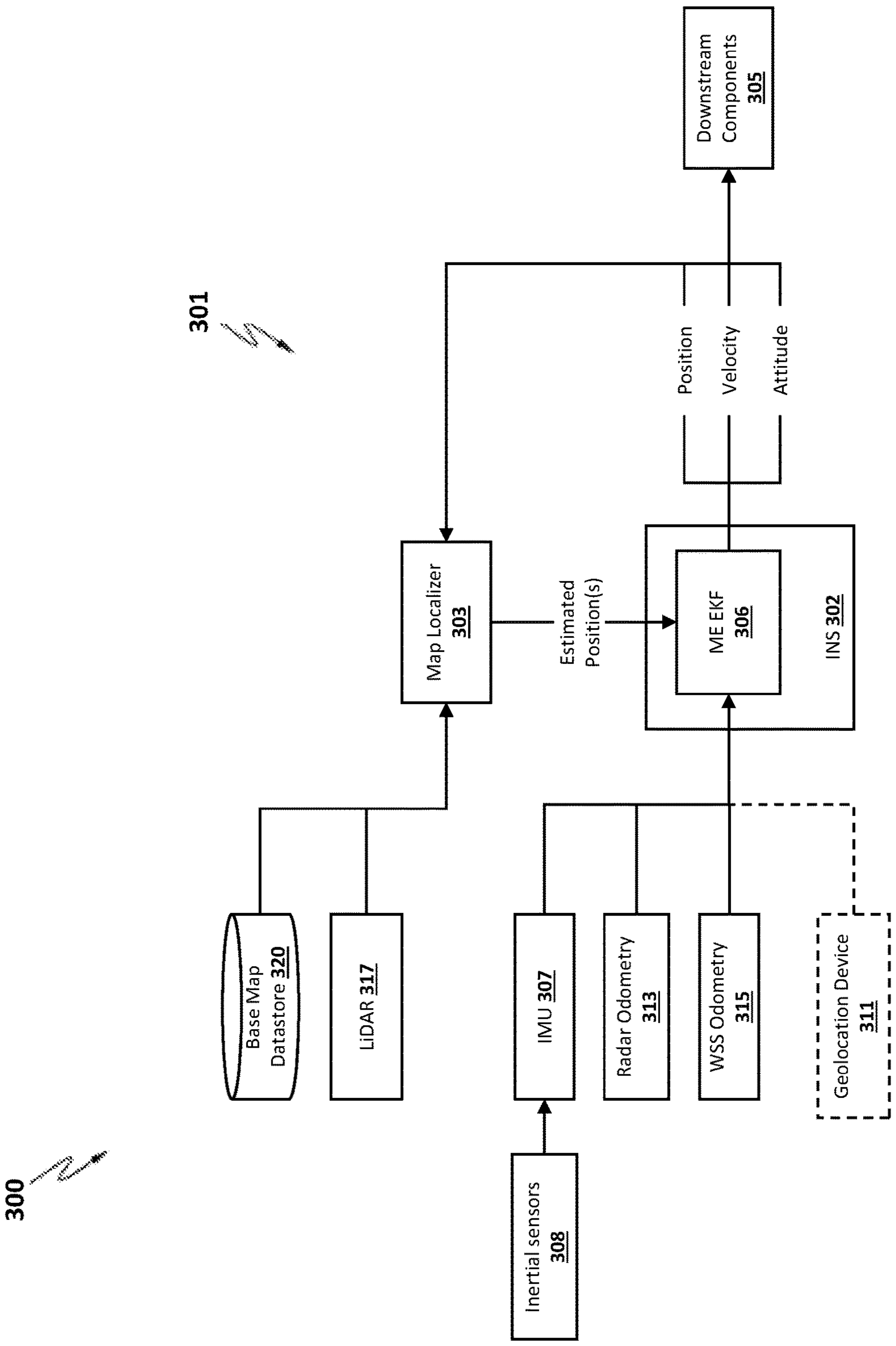
FIG. 3 shows data flow amongst components of an autonomy system when the autonomy system operates loses access to geolocation data, according to an embodiment.

FIG. 3 shows data flow amongst components of an autonomy system 300 when an autonomy system 301 operates in a geo-location denied ("geo-denied") state, according to an embodiment. The autonomy system 301 includes a map localizer 303 and any number of downstream components 305 (e.g., vehicle control module 206). The autonomy system 301 couples to various sensors, including LiDAR sensors 317, motion and inertial sensors that feed into an IMU 307, radar sensors 313, WSS sensors 315, and geolocation devices 311 (e.g., GNSS antennas, GPS devices) that obtain various types of data about the automated vehicle 300 and geolocation data from geolocation systems (e.g., GNSS). The autonomy system 301 includes and executes software programming having functions defining an INS 302 (sometimes referred to as a "motion estimator"), a map localizer 303, and a base map datastore 320 comprising non-transitory machine-readable storage medium for storing image data of base maps.

The autonomy system 301 includes hardware and software programming for performing the various processes and operations described herein. The components of the autonomy system 301 may obtain the various types of data from data sources of the automated vehicle 300, such as sensors on board the automated vehicle 300, an external geolocation system (e.g., GNSS) that provides real-time geolocation updates to the geolocation devices 311, and the onboard or remote map datastore 320. The components of the autonomy system 301 and/or the data sources may receive, derive, or otherwise generate the data for the map localizer 303, which may include related types of measurements. The autonomy system 301, or a component of the autonomy system 301 (e.g., map localizer 303), obtains the various types of data, including geolocation data received at a geolocation device 311 from a geolocation system service (e.g., GNSS service). The autonomy system 301 receives the various types of data from the sensors and/or the geolocation systems 311 that the map localizer 303 references to determine the location of the automated vehicle 300, where the received data includes, for example, location-related data or position-related data.

In some circumstances, the automated vehicle 300 loses access to real-time updates to the geolocation data from the GNSS. In these circumstances, the autonomy system 301 detects the loss of the real-time geolocation data updates and enters into the geo-denied operational state, when the autonomy system 301 invokes a geo-denied localization loop. During the geo-denied state, the autonomy system 301 iteratively executes the map localizer 303 and the INS 302. The autonomy system 301 feeds outputs of the map localizer 303 as inputs into the INS 302, and feeds outputs of the INS 302 as inputs back into the map localizer 303.

The automated vehicle 300 includes any number of inertial sensors 308 (e.g., accelerometers, gyroscopes) that generate various motion and/or orientation measurements. The IMU 307 includes hardware and software components that continuously measure and evaluate the outputs generated by the inertial sensors 308, such as the automated vehicle's 300 specific force, linear acceleration, angular rate, and angular velocity. The INS 302 obtains (e.g., receives or retrieves) the motion-related data from the IMU 307. In some cases, the autonomy system 301 operating in the geo-denied state executes the localization loop in two operational phases: detecting an error in the map localizer 303 or INS 302; and executing one or more mitigation operations to prevent the error from propagating and exacerbating errors or drift across the feedback iterations of the autonomy system 301.

The automated vehicle 300 includes one or more radar sensors 313 that generate radar odometry data. The INS 302 (or other component of the autonomy system 301) uses the radar odometry data for estimating the location, position, and velocity of the automated vehicle 300 relative to an environment around the automated vehicle 300. The INS 302 and the radar sensor 313 generate the radar odometry measurements by implementing odometry functions, where the radar sensor 313 emits radio waves that bounce off objects in the environment and return to the radar sensor 313. The radar sensor 313 measures an amount of time for a reflected radio wave to return to the radar sensor 313, and calculates the distance from the automated vehicle 300 (or the radar sensor 313) to the object that caused the reflection. In some cases, the INS 302 ingests or generates certain measurements (e.g., velocity of the automated vehicle 300) using the radar odometry data obtained from the radar sensors 313. In some cases, the autonomy system 301, or a component of the autonomy system 301 (e.g., map localizer 303), uses the radar data received from the radar sensors 313 to perform the map localization operations, generate a local map of the environment, and/or track the motion of the automated vehicle 300 within the local map.

The automated vehicle 300 includes WSS devices 315 installed in, on, or nearby the wheels to monitor rotational speed of the corresponding wheel. The WSS devices 315 generate WSS odometry data using the rotational speed measurements and feeds the WSS data into other components of the autonomy system 301, such as the INS 302 and/or IMU 307, which use the WSS data to output motion-related data and/or generate the estimated location, position, or velocity of the automated vehicle 300. For instance, by combining the rotational speed with a known wheel radius, the WSS device 315 (or other component of the autonomy system 301) calculates a distance the wheel traveled.

The geolocation device 311 includes any type of device (e.g., GNSS receiver 208), such as a Global Positioning System (GPS) device, positioned on the automated vehicle 300 and capable of capturing and forwarding geolocation data from a global navigation satellite system (GNSS). The geolocation device 311 receives one or more signals from the GNSS service and forwards the geolocation data to the autonomy system 301 for localizing and navigating the automated vehicle 300. The geolocation device 311 may provide an input to and otherwise communicate with the map localizer 303 or INS 302 in order to, for example, provide location data for use with one or more digital base maps, such as an HD image map (e.g., in a vector layer, in a raster layer or other semantic map, etc.). In operation, the geolocation device 311 receives real-time geolocation data updates from the external GNSS network.

As mentioned, the autonomy system 301 detects that the geolocation device 311 stops receiving the geolocation signals from the GNSS service containing the updates to the geolocation data for a given threshold amount of time. The autonomy system 301 then enters the geo-denied state of operation. In some circumstances, the geolocation device 311 continues to attempt forwarding the geolocation data updates to the motion estimation filter 306 of the INS 302 after the autonomy system 301 entered the geo-denied state. If the geolocation device 311 is successful in reconnecting to the GNSS, then invoking the localization loop may be premature. The autonomy system 301 may wait for a threshold period of time elapses before invoking the localization loop.

In some circumstances, when the geolocation device 311 is off or otherwise denied real-time updates to the geolocation data, the map localizer 303 or other component of the autonomy system 301 generates additional data representing signal noise in the motion estimation filter 306 (e.g., Kalman filter), which degrades the signal-to-noise ratio (SNR). In these circumstances, the autonomy system 301 may apply a low-pass filter before or as a component of the motion estimation filter 306, where the autonomy system 301 applies the low-pass filter on a gain or confidence value of the outputs of the map localizer 303 to reduce the noise and improve or smooth the quality of the map localizer 303. The low-pass filter reduces the noise introduced into, or generated by, the map localizer 303 and smooths the output signal results for the estimated locations.

The map localizer 303 and INS 302 include outlier detection functions that detect outlier measurements when the input or output measurements exceeds an error detection threshold for one or more types of data measurements. The smoother signals outputted by the map localizer 303 allow the autonomy system 301, or the map localizer 303, to more easily detect the outlier measurements of the map localizer 303. The smoother signals outputted by the motion estimation filter 306 similarly allow the autonomy system 301, or the INS 302, to more easily detect the outlier measurements of the INS 302.

The map localizer 303 includes hardware and software components of the autonomy system 301 for estimating a position (e.g., local position, global position) of the automated vehicle 300, where the map localizer 303 generates an estimated location (shown as "estimated position(s)" in FIG. 3). The map localizer 303 ingests the various types of data gathered by the autonomy system 301 from the data sources, including the onboard sensor devices or remote systems. The map localizer 303 includes processor-executed functions, such as map localization functions and outlier detection functions, of the autonomy system 301 that ingest the location-related data and/or motion-related data from the various data sources. In some cases, the location-related and motion-related data includes or is used to derive, for example, local pose data and/or global pose data, which indicate a local position or a global position of the automated vehicle 300. The inputs used by the map localizer 303 to generate the position information includes, for example, the geolocation data, the position data, the orientation data, and/or the motion data, reported from the data sources of automated vehicle 300 or from the INS 302 of the autonomy system 301.

The map localizer 303 may output estimated location data (and/or corrected location data) for the INS 302 or other downstream components 305. The data sources may include hardware or software components of the automated vehicle 300 that receive, derive, or otherwise generate the location-related data and/or motion-related data for the map localizer 303 or INS 302. The location-related data gathered by the map localizer 303 may include LiDAR sensor data generated by one or more LiDAR sensors 317.

The map localizer 303 (or other component of the autonomy system 301) generates the global pose data, which includes, for example, a position, orientation, and velocity data of the automated vehicle relative to a global reference frame, such as a geographic coordinate system (e.g., latitude, longitude). The map localizer 303 uses the global pose for locating the automated vehicle within a larger geographic context, such as a global map or a navigation system. The autonomy system 301 may determine the global pose using a combination of, for example, the sensor data (e.g., LiDAR sensors 317, radar sensors 313) from one or more types of sensors of the automated vehicle 300, the local pose data or other outputs from the INS 302, geolocation data from the geolocation device 311, and image data of a pre-stored base map from the map datastore 320. The map localizer 303 generally determines the global pose data by, for example, combining the local pose data (e.g., position, velocity, attitude) output from the INS 302 with the LiDAR sensor 317, among other possible types of inputs (e.g., cameras, radar sensors 313, image data of base maps stored in the map datastore 320).

The map localizer 303 generates a sensed map using the Lidar sensor data from the LiDAR sensors 317 or other types of sensor data. The map localizer 303 matches (e.g., compares and aligns) the sensed map of the current Lidar sensor data against the pre-stored base map for the particular environment surrounding the automated vehicle 300 to identify differences or similarities in the image data of the sensed map and the image data of the base map from the map datastore 320, using various image comparison or evaluation methods and a particle filter.

The map localizer 303 generates a plurality of particles, representing estimated locations or positions (e.g., global pose data) of the automated vehicle in the sensed map or the base map. The map localizer 303 executes the map localization functions for applying a particle filter to estimate, for example, the location, position, and/or orientation of the automated vehicle 300 relative to a known pre-stored base map (or scoring map), given some amount of noisy sensor data. The map localizer 303 generates the particles as two-dimensional coordinates representing the estimated location (e.g., global pose, current geolocation) of the automated vehicle 300 and updating the particles using the particle filter. The map localizer 303 generates the particles and applies the particle filter for localization, which includes operations for initializing, predicting, updating, resampling, and estimating location outputs. The map localizer 303 generates the estimate location of the automated vehicle 300 (e.g., global pose, current geolocation) and the autonomy system 301 feeds the output to the INS 302 and/or the downstream components 305 for navigating the automated vehicle, among other functions.

The INS 302 (or similar component of the autonomy system 301) generates the local pose data, which includes, for example, a position, orientation, and velocity data of the automated vehicle 300 relative to a local reference frame. In operation, the outputs generated by the INS 302 include or indicate an estimated motion of the automated vehicle 300, which the map localizer 303 may ingest as one or more inputs during normal operations or the geo-denied state of the autonomy system 301. In the INS 302, components of the automated vehicle 300, such as the inertial sensors 308 (e.g., accelerometers, gyroscopes) and IMU 307, continuously measure sensor inputs and generate metrics, such as the automated vehicle's 300 linear acceleration and angular velocity. The INS 302 may fuse the diverse types of sensor data by, for example, applying a motion estimation filter 306 (e.g., Kalman filter), allowing the autonomy system 301 to estimate the local pose of the automated vehicle 300 or otherwise generate the estimated motion data of the automated vehicle 300. By generating and integrating these metrics using the motion estimation filter 306, the INS 302 may compute the local pose data (including estimated motion data), such as the automated vehicle's 300 current position, orientation (roll, pitch, and yaw angles), and velocity. The autonomy system 301 may feed the local pose data, outputted by the INS 302, back into the map localizer 303, which the map localizer 303 uses for the map localization functions for estimating the automated vehicle's 300 current local location as the global pose and/or a candidate local pose.

If the autonomy system 301 detected an error in the localization loop, then the autonomy system 301 may execute one or more error mitigation operations. The error mitigation operations may include "undoing" one or more outlier measurements from the problematic data source or component of the autonomy system 301 (e.g., INS 302, map localizer 303). This can be done by running multiple filters in parallel, or for sufficiently fast detections, by replaying data stored in buffer memories (not shown), comprising non-transitory machine-readable storage configured to store a number of recent input data received from the various data sources of the automated vehicle 300.

The error mitigation operations may include disabling, ignoring, or "turning off" the problematic data source until the error has been diagnosed or mitigated by an administrator, or the autonomy system 301 determines the problematic data source outputs sufficient quality measurements that satisfy the measurement threshold.

The error mitigation operations may include tuning the feedback localization loop to reduce an impact of potentially problematic data sources before the error propagates in iterations of the localization loop. The autonomy system 301 may, for example, generate and assign a weighted value to the problematic data sources outputting measurements approaching or continually failing the outlier measurement threshold.

The error mitigation operations may include decoupling the operation of the problematic data source that generated the error or outlier measurement. The map localizer 303 includes a "search mode" that effectively decouples the map localizer 303 from the global or local estimates of the motion estimation filter 306 of the INS 302. In the search mode, the map localizer 303 rejects an initial or seed value and searches an entire available base map or sensed map for a global optimum location or value. The search mode may be fairly resource expensive because of the large search space in the map. The autonomy system 301 can enable the search mode for the map localizer 303 at periodic intervals to provide a valuable prophylactic technique for an individual or combined mitigation operation solution.

The downstream component 305 ingest certain outputs produced by the map localizer 303, where the downstream components 305 could be a component of the automated vehicle 300, the autonomy system 301, or an external data computing resource (e.g., downstream process executed by a remote server; storage at a remote non-transitory data storage). For instance, the downstream components 305 of the autonomy system 301 ingest the global and/or local pose data generated from the INS 302 and the map localizer 303, and execute vehicle navigation and control functions that generate vehicle operation instructions for operating the automated vehicle 300 (e.g., vehicle control module 206).

Figure 4:
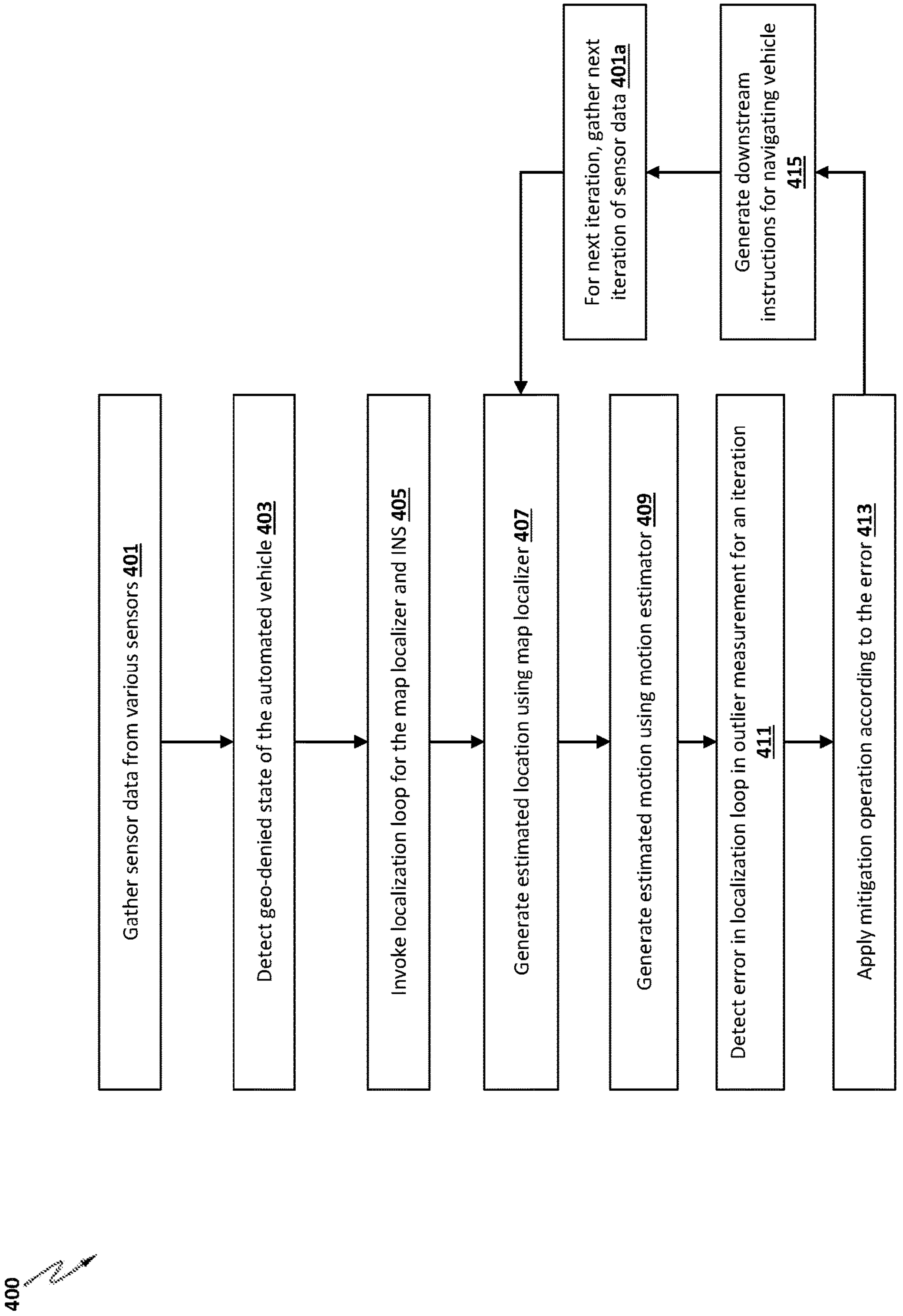
FIG. 4 shows operations of a method for localization and navigation of an automated vehicle when geolocation data is unavailable to the automated vehicle, according to an embodiment.

FIG. 4 shows operations of a method 400 for localization and navigation of an automated vehicle when geolocation data is unavailable to the automated vehicle, according to an embodiment. The operations of the method 400 are described as being performed by an autonomy system, INS, and map localizer of the automated vehicle, though embodiments may perform the various features and functions of the method 400 by any number of components of the automated vehicle or remote system components in communication with the automated vehicle.

In operation 401, the autonomy system gathers sensor data from various data sources including reflection-based sensors (e.g., LiDAR sensors, radar sensors), inertial or motion data sensors (e.g., WSS devices, accelerometers, gyroscopes), and obtains (e.g., retrieves, receives, generates) base map data from a local or remote data storage. The autonomy system may obtain image data of the base map from a non-transitory machine-readable storage medium of the automated vehicle or a remote database. The autonomy system may generate or receive image data of a sensed map using the reflection measurements in the LiDAR sensor data. Optionally, the autonomy system applies one or more normalization functions on the sensor data or the image data of the sensed map.

In some embodiments, the autonomy system stores the gathered data into one or more buffer memories, comprising non-transitory data storage devices for storing the gathered data for a preconfigured amount of data entries, iterations, or time period.

In operation 403, the autonomy system detects a geo-denied state of the automated vehicle. The autonomy system detects the geo-denied state in response to determining that the geolocation device of the automated vehicle stopped receiving real-time geolocation updates from a GNSS service. In some implementations, the autonomy system determines the geo-denied state in response to determining that the autonomy system does not receive updated geolocation for an elapsed time period that for a time-expiration threshold elapsed. In this way, the autonomy system awaits the time period before invoking the localization loop (in operation 405) and does not prematurely invoke the localization loop if the geolocation device reestablishes connectivity with the GNSS service.

In operation 405, the autonomy system invokes the localization loop for executing the programming of the map localizer and motion estimator (e.g., motion estimation filter of the INS). In the localization loop, the autonomy system iteratively gathers the data, generates estimated location outputs and estimated motion outputs, and generates operational functions. In the localization loop, the autonomy system feeds the estimated location (e.g., global pose data) generated by the map localizer, without using the geolocation data from the GNSS, back into the motion estimator. The motion estimator generates the estimated motion (e.g., local pose data), which the autonomy system feeds back into the map localizer.

In operation 407, the autonomy system generates an estimated location by applying the map localizer on the sensor data. The map localizer generates the estimated location of the automated vehicle by fusing various types of sensor data or applying a filter on sensor data. The sensor data obtained for the iteration includes, for example, LiDAR data and radar data, among other types of sensor data (e.g., image data of base maps). The estimate location includes, for example, global pose data indicating a global location with respect to a global frame of reference (e.g., latitude, longitude), a velocity, position, or other types of data.

In operation 409, the autonomy system generates an estimated motion by applying the motion estimator (e.g., motion estimation filter, Kalman filter, INS) on the sensor data and the estimated location from the map localizer. The motion estimator generates the estimated motion of the automated vehicle by applying the motion estimator on the estimated location (e.g., global pose data) from the map localizer and on the various types of sensor data obtained for the iteration. The sensor data obtained for the motion estimator includes, for example, radar odometry data, WSS odometry data, inertial data generated by inertial sensors obtained from an IMU, among other types of data source inputs. The estimated motion includes the local pose data, including a position, attitude, and velocity of the automated vehicle.

Optionally, in operation 411, the autonomy system detects the error in the localization loop in response to detecting an outlier measurement for a given iteration. The map localizer identifies an outlier measurement based on the sensor data inputs or outputs exceeding an error measurement threshold, thereby detecting the error in the map localizer of the localization loop. In some cases, In some implementations, when the autonomy system (e.g., map localizer or motion estimator) detects the outlier measurement, the autonomy system determines whether the autonomy system detected the outlier measurements within a preconfigured time threshold after detecting the outlier measurement. In this way, the autonomy system waits to confirm the outlier measurement using alternative data inputs.

In some implementations, the map localizer (or motion estimator) applies a low-pass filter on the data outputs of the map localizer. The low-pass filter is configured to reduce the amount of noise in the output data prior to, or as an integrated part of, applying the motion estimation filter (e.g., Kalman filter) on the data outputs of the map localizer. Applying the low-pass filter on the inputs or outputs, to or from the map localizer smooths the signal data representing the inputs or outputs of the map localizer. By smoothing the inputs and outputs of the map localizer, the map localizer (or other component of the autonomy system) improves functions of the motion estimation filter and makes detecting the outlier measurements by the map localizer comparatively easier.

In operation 413, the autonomy system executes one or more mitigation operations in response to the autonomy system detecting the error in the localization loop. The mitigation operations include, for example, "undoing" outlier measurements of problematic components, applying a covariance boost function, disabling the problematic data source, and disabling the localization loop, among other potential mitigation operations.

In some cases, the error mitigation operations include applying a covariance boost function on outputs of the map localizer. In some cases, the map localizer introduces a lot of noise into the signal data outputs during the geolocation data outage. The autonomy system can mitigate or correct the by decreasing the gain on the map localizer signal (expanding the covariance) fed into the motion estimation filter.

In some cases, the error mitigation operations include undoing one or more outlier measurements from the problematic data sources or components of the autonomy system (e.g., INS, map localizer). This can be done by running multiple filters in parallel, or for sufficiently fast detections, by retrieving and "replaying" the sensor data stored in the buffer memories, comprising non-transitory machine-readable storage configured to store a number of recent input data received from the various data sources of the automated vehicle. Responsive to detecting the error in at least one of the motion estimator or the map localizer, the autonomy system obtains the stored sensor data stored in a buffer memory and applies the map localizer or motion estimator on the data retrieved from the buffer memories.

In some cases, the error mitigation operations include disabling, ignoring, or "turning off" the problematic data source. The autonomy system disables the problematic data source that produced the error that caused the outlier measurement, until the error has been diagnosed or mitigated by an administrator and enters a user input that the error is mitigated. Additionally or alternatively, the autonomy system determines the problematic data source outputs sufficient quality measurements that satisfy the measurement threshold.

In some cases, the error mitigation operations may include tuning the feedback localization loop to reduce an impact of potentially problematic data sources before the error propagates across successive iterations of the localization loop. The autonomy system may, for example, generate and assign a weighted value to the problematic data sources outputting measurements approaching or continually failing the outlier measurement threshold.

In some cases, the error mitigation operations may include decoupling the operation of the problematic data source that generated the error or outlier measurement. The map localizer includes a "search mode" that effectively decouples the map localizer from the global or local estimates of the motion estimation filter of the INS. In the search mode, the map localizer rejects an initial or seed value and searches an entire available base map or sensed map for a global optimum location or value. The search mode may be fairly resource expensive because of the large search space in the map. The autonomy system can enable the search mode for the map localizer at periodic intervals to provide a valuable prophylactic technique for an individual or combined mitigation operation solution.

In operation 415, the autonomy system generates operating instructions for navigating vehicle. For instance, a vehicle control module of the autonomy system may control the behavior and maneuvers of the automated vehicle using the estimated location (e.g., global pose) and estimated motion (e.g., local pose), among other types of input data. For example, once the systems on the automated vehicle have determined the location, position, and motion of the automated vehicle with respect to map features (e.g., intersections, road signs, lane lines, etc.) the automated vehicle may use the vehicle control module 206 and associated systems to plan and execute maneuvers and/or routes with respect to recognized features of an environment. The vehicle control module, for example, generates decisions about how the automated vehicle will move through the environment to get to a goal or destination. The vehicle control module may consume information from the upstream motion estimator and the map localizer to operate the automated vehicle in the environment.

Optionally, in operation 401*a*, the autonomy system performs a next iteration of the localization loop in which the autonomy system gathers further updated sensor data. In the next iteration, the autonomy system feeds the outputs of the INS of the earlier iteration back into the map localizer for the next iteration. The autonomy system automatically reconnects the geolocation device with the GNSS service. When the autonomy system receives real-time geolocation data from the GNSS service, the autonomy system disables the localization loop and enters a normal operation state.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for geo-denied localization for an autonomous vehicle, the method comprising:

detecting, by a processor of an autonomous vehicle, a geo-denied state of the autonomous vehicle based upon geolocation data from a geolocation device of the autonomous vehicle;

invoking, by the processor, programming of a localization loop of a map localizer and a motion estimator in response to the processor detecting the geo-denied state;

during execution of a first iteration of the localization loop in the geo-denied state:

generating, by the processor, an estimated location of the autonomous vehicle by applying the map localizer on LiDAR data of sensor data obtained for the first iteration from a LiDAR sensor of a plurality of sensors; and generating, by the processor, an estimated motion of the autonomous vehicle by applying the motion estimator on the estimated location from the map localizer and on the sensor data obtained for the first iteration, responsive to detecting an error in at least one of the motion estimator or the map localizer, disabling, by the processor, ingestion of the sensor data from at least one sensor; and control operation of the autonomous vehicle, based on the estimated location and the estimated motion.

2. The method according to claim 1, further comprising, during execution of a later iteration of the localization loop, updating, by the processor, the estimated location of the autonomous vehicle for the later iteration by applying the map localizer on the estimated motion for an earlier iteration and the LiDAR data of the sensor data obtained for the later iteration.

3. The method according to claim 2, further comprising identifying, by the processor, an outlier measurement based on the sensor data of the later iteration exceeding an error measurement threshold, thereby detecting an error in an output of the map localizer of the localization loop.

4. The method according to claim 3, wherein detecting the outlier measurement includes determining, by the processor, the outlier measurement based upon a time threshold.

5. The method according to claim 1, further comprising, during execution of a later iteration of the localization loop, updating, by the processor, the estimated motion of the autonomous vehicle for the later iteration by applying the motion estimator on the estimated location generated by the map localizer for the later iteration and the sensor data obtained for the later iteration.

6. The method according to claim 5, further comprising identifying, by the processor, an outlier measurement based on the sensor data for the later iteration exceeding an error measurement threshold, thereby detecting an error in an output of the motion estimator of the localization loop.

7. The method according to claim 1, further comprising generating, by the processor, an operating instruction for the autonomous vehicle using the estimated location and the estimated motion generated for the first iteration.

8. The method according to claim 1, further comprising, responsive to detecting an error in at least one of the input or the output of the map localizer, applying, by the processor, a covariance boosting value on the output of the map localizer.

9. The method according to claim 1, further comprising, responsive to detecting an error in at least one of the motion estimator or the map localizer, obtaining, by the processor, stored sensor data stored in a buffer memory.

10. The method according to claim 1, further comprising, responsive to detecting an error in at least one of the motion estimator or the map localizer, halting, by the processor, execution of the localization loop.

11. The method according to claim 1, wherein detecting the geo-denied state includes, determining, by the processor, that a time-expiration threshold elapsed for receiving updated geolocation data from a geolocation service.

12. The method according to claim 1, wherein during each iteration of the localization loop, applying, by the processor, a low-pass filter on one or more outputs of the map localizer, thereby reducing noise outputted from the map localizer, the one or more inputs including at least one of the sensor data obtained from the plurality of sensors, geolocation data obtained from a geolocation device, or a feedback output from the motion estimator.

13. A system for localizing and navigating an autonomous vehicle, the system comprising:

a plurality of sensors of an autonomous vehicle for generating sensor data, including a geolocation device for obtaining geolocation data from a geolocation service system and a LiDAR sensor for obtaining LiDAR data;

a processor coupled to the plurality of sensors and configured to:

invoke programming of a localization loop of a map localizer and a motion estimator, in response to detecting a geo-denied state based upon the geolocation data;

during execution of a first iteration of the localization loop in the geo-denied state:

generate an estimated location of the autonomous vehicle by applying the map localizer on LiDAR data of the sensor data obtained for the first iteration; and generate an estimated motion of the autonomous vehicle by applying the motion estimator on the estimated location from the map localizer and on the sensor data obtained for the first iteration; and apply a low-pass filter on one or more inputs to the map localizer, thereby reducing noise inputted to the map localizer, the one or more inputs including at least one of i) the sensor data obtained from the plurality of sensors, ii) geolocation data obtained from a geolocation device, or iii) a feedback output from the motion estimator; and control operation of the autonomous vehicle, based on the estimated location and the estimated motion.

14. The system according to claim 13, wherein the processor is further configured to generate an operating instruction for the autonomous vehicle using the estimated location and the estimated motion generated for the first iteration.

15. The system according to claim 13, wherein the processor is further configured to, during execution of a later iteration of the localization loop:

update the estimated location of the autonomous vehicle for the later iteration by applying the map localizer on the estimated motion for an earlier iteration and the LiDAR data of the sensor data obtained for the later iteration; and identify an outlier measurement obtained from the sensor data of the later iteration exceeding an error measurement threshold, thereby detecting an error in an output of the map localizer of the localization loop.

16. The system according to claim 13, wherein the processor is further configured to, during execution of a later iteration of the localization loop:

update the estimated motion of the autonomous vehicle for the later iteration by applying the motion estimator on the estimated location generated by the map localizer for the later iteration and the sensor data obtained for the later iteration; and identify an outlier measurement based on the sensor data for the later iteration exceeding an error measurement threshold, thereby detecting an error in an output of the motion estimator of the localization loop.

17. The system according to claim 13, wherein the processor is further configured to, responsive to detecting an error in at least one of the motion estimator or the map localizer, apply a covariance boosting value on the output of the map localizer.

18. The system according to claim 13, wherein the processor is further configured to, responsive to detecting an error in at least one of the motion estimator or the map localizer, halt execution of the localization loop.

19. The system according to claim 13, wherein the processor is further configured to, during each iteration of the localization loop, apply the low-pass filter on the one or more inputs to the map localizer.

* * * * *